US009601242B2

(12) United States Patent
Dais et al.

(10) Patent No.: US 9,601,242 B2
(45) Date of Patent: Mar. 21, 2017

(54) MOLD FOR IMPREGNATING A PREFABRICATED CONDENSER CORE OF A HIGH-VOLTAGE BUSHING AND DEVICE FOR FORMING A CONDENSER CORE OF A HIGH-VOLTAGE BUSHING

(71) Applicant: ABB Technology AG, Zürich (CH)

(72) Inventors: Ansgar Dais, Dietikon (CH); Jan Czyzewski, Adliswil (CH); Victoria Maurer, Solothurn (CH); Walter Odermatt, Jackson, TN (US)

(73) Assignee: ABB Schweiz AG, Baden (CH)

( * ) Notice: Subject to any disclaimer, the term of this patent is extended or adjusted under 35 U.S.C. 154(b) by 339 days.

(21) Appl. No.: 14/207,890

(22) Filed: Mar. 13, 2014

(65) Prior Publication Data

US 2014/0262438 A1    Sep. 18, 2014

(30) Foreign Application Priority Data

Mar. 14, 2013   (EP) .................................... 13159199

(51) Int. Cl.
*B29C 33/00*   (2006.01)
*B29C 39/10*   (2006.01)
(Continued)

(52) U.S. Cl.
CPC ........... *H01B 17/56* (2013.01); *B29C 33/005* (2013.01); *B29C 33/0038* (2013.01);
(Continued)

(58) Field of Classification Search
CPC ............. B29C 33/0038; B29C 33/005; B29C 33/0083; B29C 39/10; B29C 39/40; H01B 19/04
See application file for complete search history.

(56) References Cited

U.S. PATENT DOCUMENTS 1,165,025 A  *  12/1915  Roth ....................... B29C 39/10
                                                          249/106
2,985,916 A  *   5/1961  Kordes ................. B29C 33/448
                                                           249/61

(Continued)

FOREIGN PATENT DOCUMENTS

EP         0 814 487 A1    12/1997
JP         2001-85275 A     3/2001

OTHER PUBLICATIONS

European Search Report dated Oct. 28, 2013.

*Primary Examiner* — Robert B Davis
(74) *Attorney, Agent, or Firm* — Taft Stettinius & Hollister LLP

(57) ABSTRACT

An exemplary mold is disclosed for impregnating a prefabricated condenser core (C) of a high voltage bushing with a liquid resin and includes two mold modules movable against each other and shaped to form an axially symmetric mold cavity. The mold forms a column of cylindrical design, in which the at least two mold modules are arranged on top of each other. A first of the two mold modules can be executed as a hollow cylinder. Two opposing front faces of the two mold modules and a circular O-ring arranged between the two opposing front faces form a first sealing interface of the metal mold. Such a mold can have a very efficient sealing system and allow high pressures to be applied to the liquid resin and a beneficial forming of the condenser core in a device in which the resin is cured according to a specified temperature profile.

26 Claims, 4 Drawing Sheets

(51) Int. Cl.
*B29C 39/40* (2006.01)
*H01B 19/04* (2006.01)
*H01B 17/56* (2006.01)
*B29C 33/26* (2006.01)

(52) U.S. Cl.
CPC .............. *H01B 19/04* (2013.01); *B29C 33/26* (2013.01); *B29C 39/10* (2013.01); *B29C 39/40* (2013.01)

(56) References Cited

U.S. PATENT DOCUMENTS

| | | | | |
|---|---|---|---|---|
| 3,184,528 A | * | 5/1965 | Norwalk | B28B 7/36 264/109 |
| 5,759,589 A | * | 6/1998 | George, Jr. | B29C 39/10 264/272.2 |
| 6,019,931 A | | 2/2000 | Kashiwagi | |
| 6,048,618 A | | 4/2000 | Berger et al. | |
| 6,146,419 A | * | 11/2000 | Eaton | A61L 27/3637 264/222 |

* cited by examiner

MOLD FOR IMPREGNATING A PREFABRICATED CONDENSER CORE OF A HIGH-VOLTAGE BUSHING AND DEVICE FOR FORMING A CONDENSER CORE OF A HIGH-VOLTAGE BUSHING

RELATED APPLICATION(S)

This application claims priority under 35 U.S.C. §119 to European Patent Application No. 13159199.2 filed in Europe on Mar. 14, 2013, the entire content of which is hereby incorporated by reference in its entirety.

FIELD

The disclosure relates to the field of high-voltage technology and concerns a mold for impregnating a prefabricated condenser core of a high-voltage bushing, controlling the temperature of the mold in a curing process, and a device for forming a condenser core of a high-voltage bushing, the device including the mold.

BACKGROUND INFORMATION

A high-voltage bushing is a component that can be used to carry current at high potential from an encapsulated active part of a first high-voltage component, such as a transformer, a generator or a circuit breaker, through a barrier, for example, a grounded housing of the first component, to a second high-voltage component, for example, a high voltage line. Such a bushing can be used for example, in switchgear installations or in a high-voltage machine, like a generator or a transformer, for voltages up to several hundred kV, for example for voltages between 24 and 800 kV. In order to decrease and control the electric field, the bushing can include a condenser core which facilitates electrical stress control through at least one electrically conductive or semi-conductive field grading element, which in an electrically insulating manner, can be embedded in an insulator of the condenser core. The condenser core decreases the electric field gradient and distributes the electric field homogeneously along the length of the bushing.

Such a condenser core can be manufactured as described herein. A layered spacer is wound around a central conductor, a tube or a mandrel from an electrically insulating substance and field grading elements which are arranged between successive layers of the spacer. Such a structure is called a prefabricated condenser core. The prefabricated condenser core is put in a mold and impregnated with a liquid resin, for example, an epoxy. Subsequent curing of the resin forms the condenser core in which the prefabricated condenser core is embedded in an electrically insulating matrix material of the cured resin.

Production of cast epoxy condenser core parts can be made in a vacuum molding process or in an APG (Automated pressure gelation) process.

In the vacuum molding process, molds are preheated to an appropriate casting temperature and then put in an autoclave where the epoxy resin is cast under vacuum. Once the molds are filled, they are brought to ovens where they are heated to the appropriate curing temperature. After curing, the molds cool down and are opened. The work pieces are taken out and the molds cleaned and reassembled for the next casting cycle.

In an APG Process the mold can be split in half with a mold split line along an axis of the condenser core. The two mold halves are fixed on heated plates of a horizontal press. These plates have different heating zones to create a temperature gradient that forces a curing front in one direction to allow the compensation of the shrinkage. To compensate for shrinkage, the liquid material is put under pressure from the side that cures last. The mold in the APG process can also be surrounded by a vacuum frame if impregnation takes place under vacuum. The vacuum frame is particularly useful when the mold is assembled of a larger number of parts with complicated partition surfaces running between them.

Such a mold can include two elongated halves and at its ends can be very difficult to be appropriately sealed, due to very long partition lines axially extending along the condenser core and due to triple points on places where the partition lines between the two halves of the mold meet the partition lines between the halves and the condenser core. In consequence, leakages of the resin can appear when the pressure is increased in the compensation vessel to generate resin flow for appropriately compensating the molding shrinkage.

A mold and a device for forming a high voltage insulator are disclosed in U.S. Pat. No. 6,019,931.

SUMMARY

A mold is disclosed for impregnating a prefabricated condenser core (C) of a high voltage bushing with a liquid resin, the mold comprising: at least two mold modules movable against each other and shaped to form a mold cavity, the mold being a column of cylindrical design, in which the at least two mold modules are arranged one on top of the other; and a first mold module of the at least two mold modules is a hollow cylinder, and the at least two mold modules each have a front face for forming a first sealable interface with an opposing front face of another mold module of the at least two mold modules.

A device is disclosed for forming a condenser core of a high voltage bushing, the device comprising: a mold for impregnating a prefabricated condenser core (c) of a high voltage bushing with a liquid resin, the mold including: at least two mold modules movable against each other and shaped to form a mold cavity, the mold being a column of cylindrical design, in which the at least two mold modules are arranged one on top of the other; a first mold module of the at least two mold modules being a hollow cylinder; and the at least two mold modules each having a front face for forming a first sealing interface, with an opposing front face of another mold module of the at least two mold modules; and a heater for controlling temperature of the mold when in a curing process, the heater, comprising: a contractible tubular jacket vertically extending from a bottom to top of the mold, the tubular jacket including at least two heat supplying or heat dissipating zones annular around the mold, that are arranged one on top of the other from the bottom to the top of the mold, and that are adjustable independently from one another with respect to the supply or dissipation of heat.

BRIEF DESCRIPTIONS OF THE DRAWINGS

Exemplary embodiments of a mold and a device according to the disclosure including the mold, are shown in figures as follows.

Figure 1:
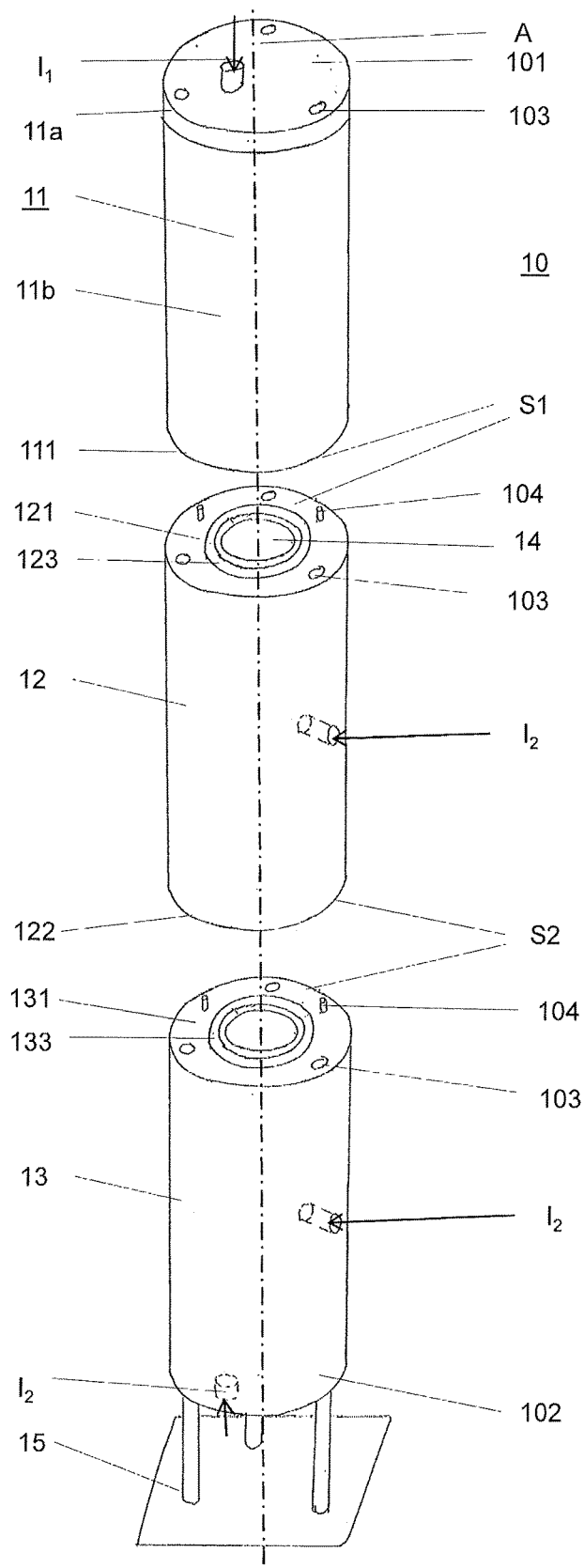
FIG. 1 shows an exploded view a first exemplary embodiment of a mold according to the disclosure.
Figure 3:
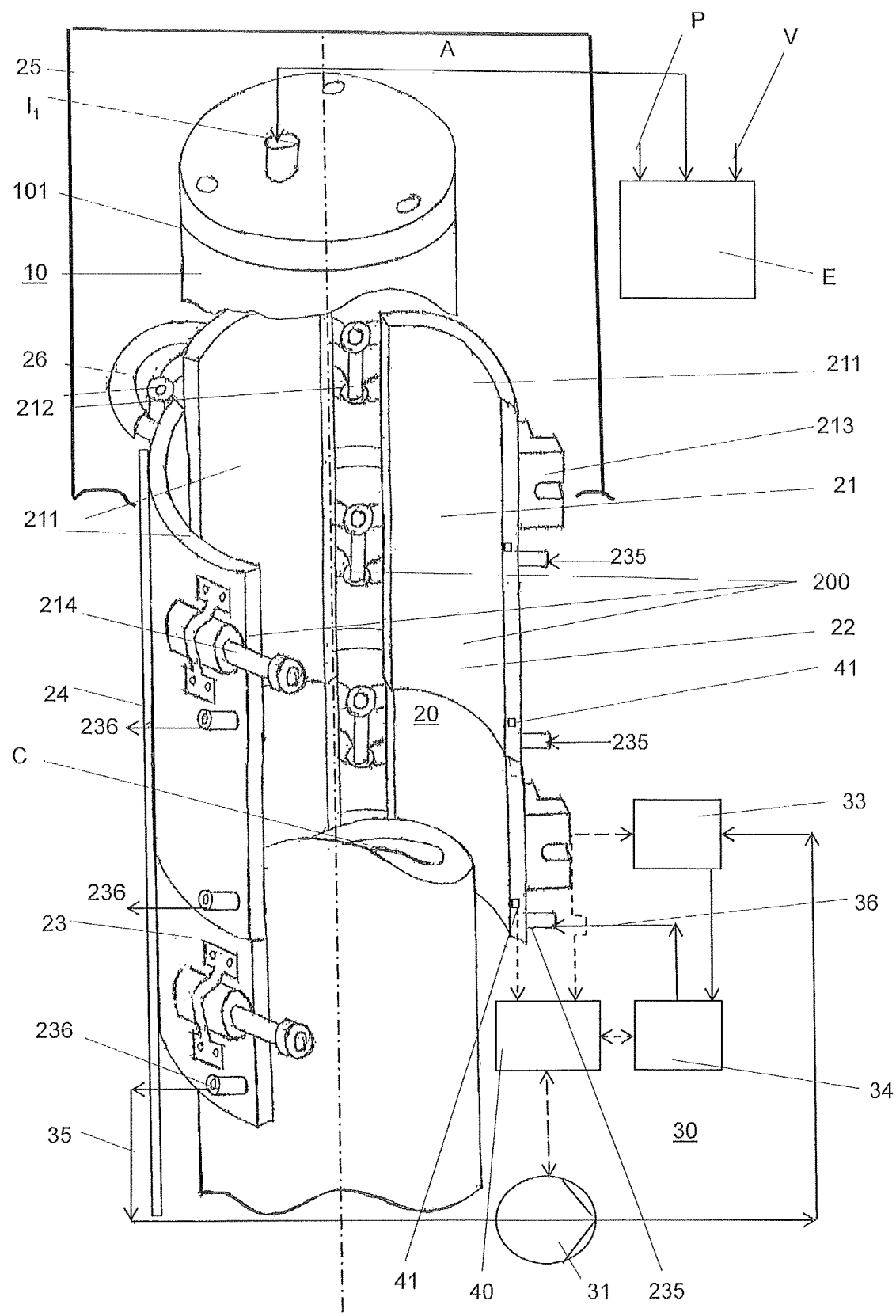
Figure 4:
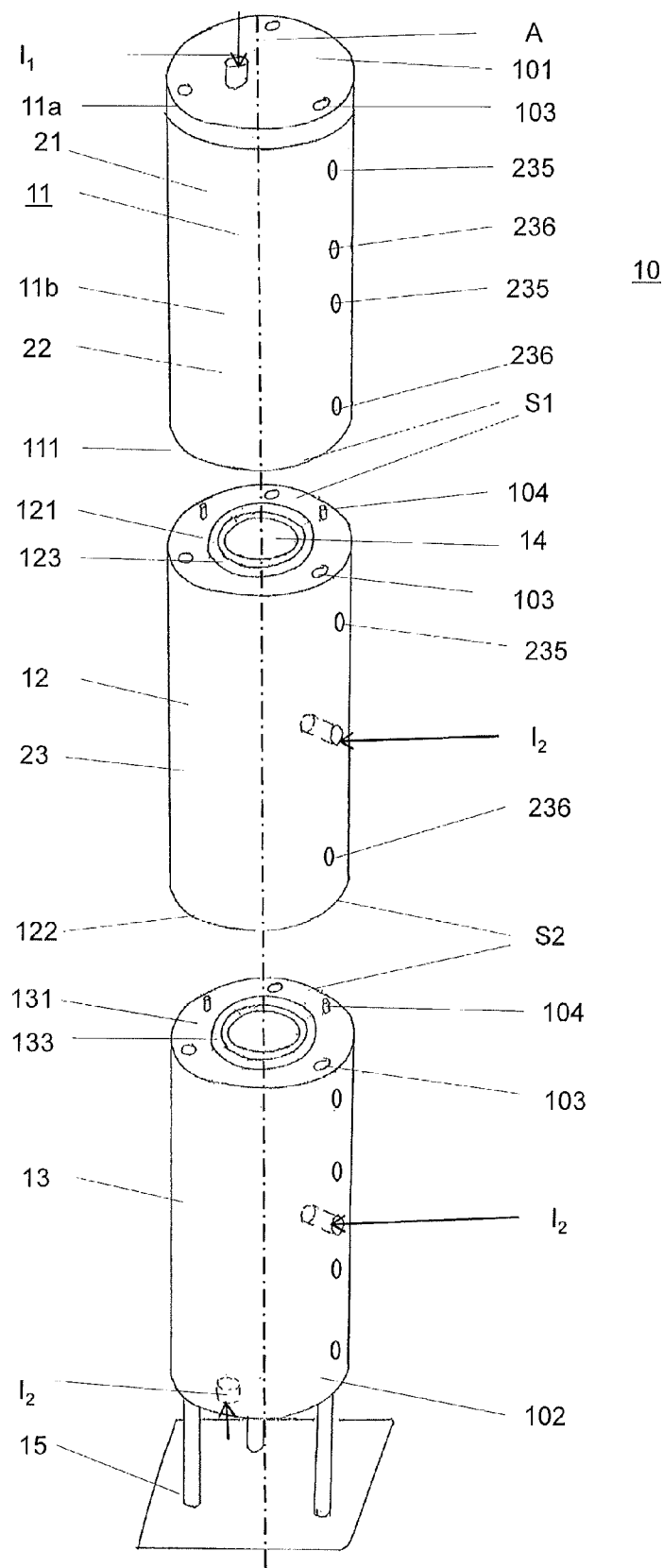

FIG. 3 show an exemplary embodiment of a device of a casting station including the mold according to FIG. 1 charged with a prefabricated condenser core and used for casting the prefabricated condenser core with a curable resin and for curing the resin according to a specified curing program; and FIG. 4 shows in exploded view a second exemplary embodiment of a mold according to the disclosure.

The reference signs used in the figures and their meaning are summarized in a list of reference signs. Generally, alike or alike-functioning parts are given the same reference signs. The described exemplary embodiments are meant as example and shall not confine the disclosure.

DETAILED DESCRIPTION

Exemplary embodiments of the disclosure relate to a mold for impregnating a prefabricated condenser core of a high voltage bushing with a liquid resin and a device for forming the condenser core including the mold and a heater for controlling the temperature of the mold in a curing process, which mold and which device allow an efficient production and a very high quality of the condenser core.

The mold according to an exemplary embodiment of the disclosure includes at least two mold modules movable against each other and shaped to form a mold cavity. The mold forms a column of cylindrical design, in which the at least two mold modules can be arranged on top of each other. A first of the at least two mold modules is executed as a hollow cylinder and two opposing front faces of the at least two mold modules form a first sealing interface of the mold.

Thus, at a given diameter, an axial extension of the mold cavity can be changed by removing or inserting mold modules. Furthermore, the mold can only include one or more sealing interfaces of circular design and extending around an axis of the mold in circumferential direction. Thus, the sealing interfaces of the mold can be restricted to circular partition lines between the different mold modules. Partition lines extended along the axis can be avoided. For this reason, in the mold, a crossing of an axial extended and an circumferentially extended partition line does not occur and the mold can be sealed completely with circular O-rings which can be inserted in appropriate grooves formed in front faces of the modules. The mold can be completely vacuum-tight. Thus, a vacuum frame around the mold is not needed. The probability of leakage is small and it is allowed to apply high pressures to the mold in order to force a resin flow for compensating for shrinkage of the resin during the curing process. The axial symmetric design of the mold including the mold modules allows the mold to be entirely manufactured by turning of raw material instead of the more expensive milling out of square blocks.

In an exemplary embodiment of a mold according to the disclosure, at least a part of an inner surface of the first mold module tapers conically from the first sealable interface to a bottom of the mold.

A second of the at least two mold modules can be executed as a hollow cylinder and can include a closed front face forming the top of the mold. At least a part of an inner surface of the second mold module can taper conically from the first sealable interface to a top of the mold.

The second mold module can include a modular section which is executed as a disk.

The closed front face forming the top of the mold or the modular section which is executed as disk can include at least a combined inlet and outlet for applying liquid resin from the mold cavity to an expansion vessel or for applying optionally a liquid resin under pressure or a vacuum to the mold cavity.

At least a third mold module can be arranged with a front face on an opposing front face of the first mold module. The two opposing front faces of the first and the third mold module form a second sealing interface of the mold.

The at least third mold module can be executed as hollow cylinder. At least a part of an inner surface of the third mold module can taper conically from the second sealable interface to the bottom of the mold.

The third mold module can form the bottom of the mold and can include at least a first inlet for applying liquid resin to the evacuated mold cavity.

At least a second inlet for applying liquid resin to the evacuated mold cavity can be arranged in a cylindrical wall of at least one of the third or the second mold module.

Axially extended holes for receiving bolt members can be inserted into the opposing two front faces of the at least two mold modules.

An assembling aid can be inserted into the opposing two front faces of the at least two mold modules.

At least one groove for receiving an O-ring can be inserted into one of the two opposing front faces of the at least two mold modules.

In an exemplary embodiment of the mold according to the disclosure, two heat supplying or heat dissipating zones can be integrated in the cylindrical wall of the mold. Such a mold can include at least two zones that are annular around the mold cavity, that are arranged one on top of the other from the bottom to the top of the mold and that are adjustable independently from one another with respect to the supply or dissipation of heat. The supply and dissipation of the heat can be executed with a heat carrier fluid which passes a first of the at least two zones in a conduit which is machined in or attached to the cylindrical wall of a mold of one or more of the modules of the mold and which does not depend on a corresponding conduit arranged in a second of the at least two zones.

The device for forming a condenser core of a high voltage bushing according to the disclosure includes the mold according to exemplary embodiments of the disclosure and a heater for controlling the temperature of the mold in a curing process. The heater includes a contractible tubular jacket which is vertically extended from the bottom to the top of the mold and which includes at least two heat supplying or heat dissipating zones, that are annular around the mold, that are arranged one on top of the other from the bottom to the top of the mold and that are adjustable independently from one another with respect to the supply or dissipation of heat.

For reason of an almost perfect axial symmetry of the mold and the contractible tubular jacket, the device according to an exemplary embodiment of the disclosure can allow a very equal temperature distribution around the mold in the circumferential direction. This can significantly improve the stability of the casting and curing process and is useful for a low yield production of high-voltage bushings including a condenser core formed with the device. Furthermore, for reason of the at least two heat supplying and heat dissipating zones which can be heated or cooled independently from one another, the device according to an exemplary embodiment of the disclosure during the curing process can generate any desired temperature profile along the axis of the mold. For example, a temperature profile with a large local gradient along the axis of the mold can be realized easily.

In an exemplary embodiment of the device according to the disclosure, a first of the at least two zones can be integrated in a first of at least two annular contractible sections of the tubular jacket and a second of the at least two zones can be integrated in a second of the at least two jacket sections. Each of the at least two contractible jacket sections includes at least two curved jacket segments which are pivotably linked together and which includes a tensioner for pushing the at least two curved jacket segments against a cylindrical surface of the mold.

Just one curved jacket segment of each of the at least two jacket sections can be supported on a stationary carrier of the contractible tubular jacket.

In an exemplary embodiment of the device according to the disclosure, the first and the second of the at least two zones can be integrated in a single annular contractible section of the tubular jacket. The contractible jacket section can include at least two curved jacket segments which are pivotably linked together and which include a tensioner for pushing the at least two curved jacket segments against a cylindrical surface of the mold.

In an exemplary embodiment of the device according to the disclosure, in which each of the at least two heat supplying or heat dissipating zones include a first conduit with an inlet and an outlet for receiving a heat carrier fluid, the temperature distribution along the axis of the mold can be adjusted very precisely. The fluid can be cooled and heated easily. Therefore the specified temperature profile can be achieved even when the device is thermally insulated on its full surface with an enclosure. Thus temperature profiles can be calculated and put into practice as they should be. Compromises due to the inability of the set-up to run temperature profiles as desired can be avoided.

The heater can further include a conveying and heating unit for conveying and for heating or cooling the heat carrier fluid, a second conduit which connects the outlet of the first conduit to an input of the conveying and heating unit and a third conduit which connects an output of the conveying and heating unit to the inlet of the first conduit and a control unit which controls the temperature and the amount of conveyed heat carrier fluid at the output of the conveying and heating unit.

The conveying and heating unit can include a conveying pump, a control valve arrangement, a heater and a heat exchanger. The conveying and heating unit can be controllable in a manner to convey the heat carrier fluid through the heater or the heat exchanger.

At least two temperature sensors can be provided from which a first is arranged in the first of the at least two heat supplying or heat dissipating zones.

At least two temperature sensors can be provided from which a first is arranged in the third conduit.

An exemplary embodiment of the device according to the disclosure in which an enclosure of a thermal insulating material encloses the jacket tube and fittings of the mold and the jacket tube allows a further improvement of uniformity of the temperature around the mold and to stabilize the desired temperature profile along the axis of the mold.

Further advantages and applications of the disclosure are given in drawings and in a part of the description which follows.

A mold according to FIG. 1 is marked with the reference sign 10 and forms a column of cylindrical design with a vertically extended axis of symmetry A. The mold 10 includes three axially vertically extended mold modules 11, 12 and 13 which can be moved against each other along the axis A and which, in the closed mold 10, are arranged on top of each other. The mold modules 11, 12, 13 are shaped to form an axially symmetric mold cavity 14 for receiving a prefabricated condenser core. The mold modules 11, 12, 13 are executed as a hollow cylinder, respectively. Each of two opposing front faces 111 and 121 of the mold modules 11 and 12 respectively and front faces 122 and 131 of the mold modules 12 and 13 respectively include an annular sealing surface which uniformly extends around the mold cavity 14.

In the closed position of the metal mold 10, the sealing surfaces of two opposing front faces are pressed against each other and form two sealing interfaces S1 and S2. As can be taken from FIG. 1, such sealing interfaces S1, S2 are achieved by respective grooves 123, 133 which are machined into the sealing surface of the front faces 121, 131 and an O-ring which is arranged in the grooves 123, 133 and which in the closed metal mold is in sealing contact with the sealing surfaces of the front faces 121, 111, 131, 122.

At least one of the sealable interfaces, for instance the sealing interface S1, is provided for opening the metal mold 10 at the end of a manufacturing process of the condenser core. When an upper part of the metal mold 10 includes the mold section 11 and a lower part includes the remaining mold sections 12 and 13, the separation of these two mold parts from one another enables the access to the condenser core. The inner (axially extended) surface of upper and the lower part of the metal mold 10 tapers conically from the sealing interface S1 to a top 101, and to a bottom 102 of the metal mold 10. For reason of such a design of the inner surface of the mold cavity 14 the two mold parts can be removed with a small force and without stressing the condenser core mechanically.

Figure 2:
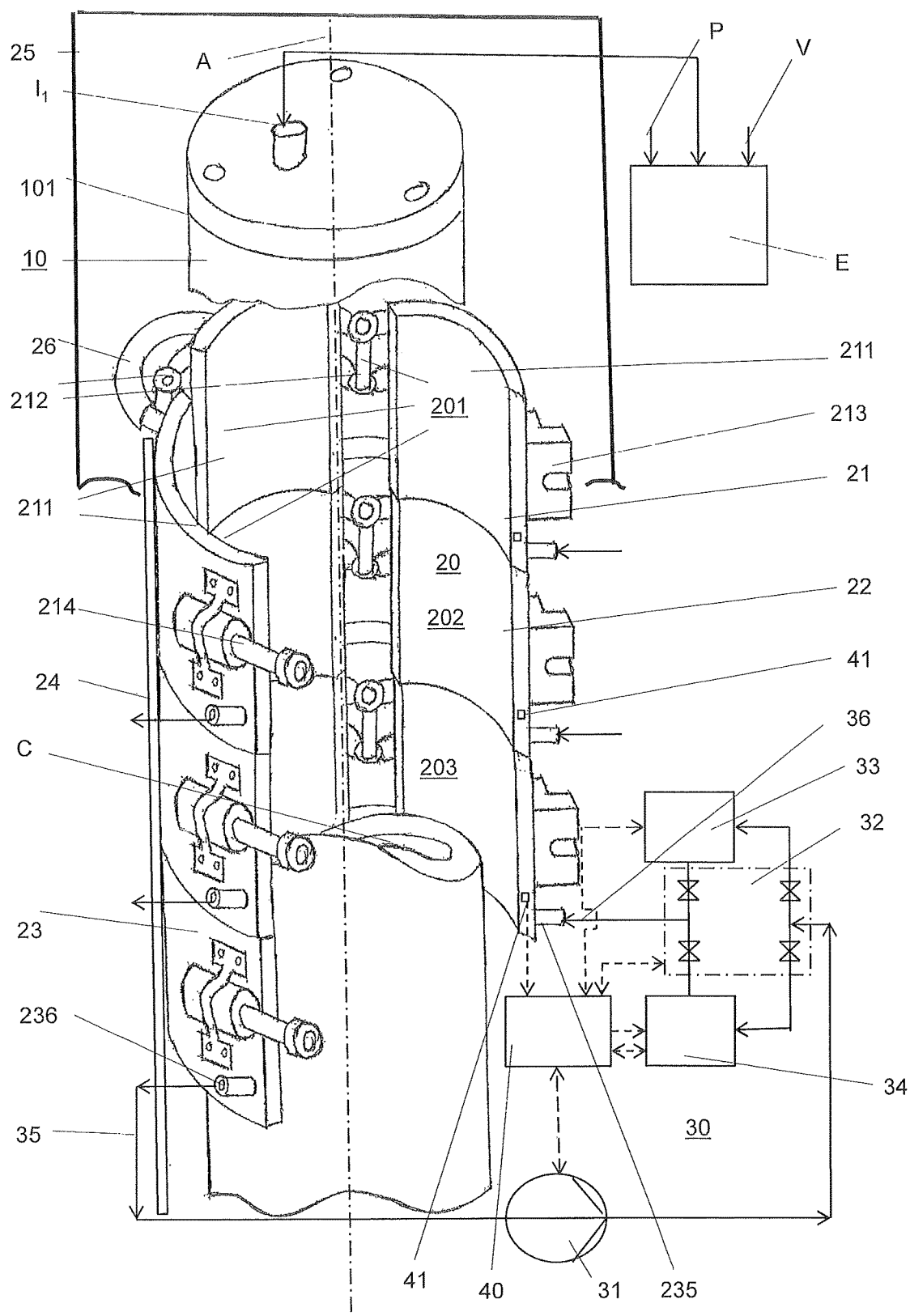
FIG. 2 shows an exemplary embodiment of a device of a casting station including the mold according to FIG. 1 charged with a prefabricated condenser core and used for casting the prefabricated condenser core with a curable resin and for curing the resin according to a specified curing program.

The mold module 11 forms the top 101 of the mold 10 and includes a combined inlet and outlet $I_1$ which during an impregnation and curing process connects, for instance by a hose, the mold cavity 14 to an expansion vessel E shown in FIG. 2.

The inlet and outlet $I_1$ is arranged in a front face of the mold section 11 which is executed as a disk 11a. The disk 11a forms an axially symmetrical modular section of the module 11. The modular section 11a is in the afore-described sealable manner detachably connected to a further modular section 11b of the module 11. The modular section 11b is executed as hollow cylinder. Instead of being composed of the modular sections 11a and 11b, the mold module 11 can be designed as a single part integrating the two modular sections 11a and 11b without any seals and connectors.

The mold module 12 includes an inlet $I_2$ for applying a liquid resin to the evacuated mold cavity 14. Further inlets $I_2$ are arranged in the bottom 102 of the metal mold 10 and in the outer cylindrical wall of the modular mold module 13. The module 13 includes a pedestal 15 for keeping the mold in a vertical position.

Furthermore axially extended holes 103 for receiving axially extended pins, for example screws, are inserted in the opposing front faces of the modular sections and/or mold modules 11a, 11b, 11, 12, 13.

The reference sign 104 marks an assembling aid with male and female members which is inserted in the opposing front faces, for instance 111 and 121, in a manner to stack the different mold modules 11, 12, 13 and also 11a and 11b in a predetermined order.

The metal mold 10 can be composed of two mold modules but also of four, five or more mold sections. In a simple exemplary embodiment according to the disclosure, the metal mold 10 only includes two mold modules and just one sealable interface.

At a given diameter, the axial extension of the mold cavity can be changed by removing or inserting mold modules 11, 12, 13, 11a, 11b easily. Furthermore, the mold 10 only includes sealing interfaces S1, S2 of circular design and extended around the axis A of the mold 10 in circumferential direction. Thus, the sealing interfaces of the mold are restricted to circular partition lines between the different mold modules. Partition lines extended along the axis A are avoided. For this reason in the metal mold 10, a crossing of an axially extended and a circumferentially extended partition line does not occur and the mold 10 can be sealed completely with circular O-rings which are inserted in appropriate grooves, for instance 123, 133, formed in front faces, for instance 121, 131, of the mold modules. Hence, the mold 10 can be completely vacuum-tight. Thus, a vacuum frame around the mold is not needed. Compared with a known metal mold, in the metal mold 10 the afore-described sealing interfaces S1, S2 can be much more efficient. Thus, the probability of leakage is small and it is allowed to apply high pressures in order to force the resin flow compensating the shrinkage of the resin during the curing process. The axial symmetric design of the mold of the mold modules allows the mold 10 to be turned out entirely of round raw material, like steel, an aluminium alloy or a polymeric plastic, instead of the more expensive milling out of square blocks.

Before an impregnation and curing process is started, the afore-mentioned prefabricated condenser core for a high voltage bushing is inserted in the mold cavity 14. The insertion is enabled when one of the sealing interfaces S1, S2 or the sealing interface between the mold modules 11a and 11b is open. Afterwards the sealing interface is closed and the assembled and charged mold 10 will then be moved into a casting station and installed in a vertical position on the pedestal 15.

As shown in FIG. 2 in the casting station, the mold 10, which receives the prefabricated condenser core marked with the reference sign C, is positioned within an openable and closable contractible tubular jacket 20. The tubular jacket 20 is shown in an open position. The jacket 20 can be heated and cooled in a controlled manner. The jacket is vertically extended from the bottom to the top 101 of the mold 10 and includes heat supplying or heat dissipating zones from which three zones 21, 22, 23 are shown. The zones are extended annular around the axis A of the mold 10. The zones are arranged one, for instance 22, on top of the other, for instance 23, from the bottom to the top 101 of the mold 10. Each of the three 21, 22, 23 and of similar further zones are integrated in just one of three and of similar further annular contractible jacket sections 201, 202, 203 of the tubular jacket 20 and includes three curved jacket segments 211 (marked only in jacket section 201). The three segments 211 are pivotably linked together by two hinges 212. A first and a second of the segments 211 bears a part 213 and a counterpart 214 of a clamping device.

Each of the two heat supplying or heat dissipating zones includes a conduit for receiving a heat carrier fluid. Each conduit includes an inlet and an outlet for the fluid. Only the inlet 235 and the outlet 236 of the zone 23 are marked in FIG. 2. The conduit passes all three jacket segments 211 of the jacket section, for instance 203, and includes fitting hoses 26 which connect sections of the conduit which are formed in adjacent jacket segments 211. Thus the heat carrier fluid, for example oil, can be enabled to flow in each of the zone all around the mold 10.

When the mold is positioned in the jacket 20, the part 213 and the counterpart 214 are drawn together, for example with mechanically, pneumatically and/or hydraulic forces, the drawing together of the three segments 211 contracts the jacket section, for instance 201. The contracted jacket section forms the annular shaped zone, for instance 21, in which the three curved jacket segments 211 are firmly pushed against the cylindrical surface of the mold 10 in order to achieve an optimum of heat transmission between the zone 21 and the mold 10 in a heat supplying process in a heat dissipating process.

The jacket 20 includes sufficient jacket sections 201, 202, 203 for zones 21, 22, 23 in order to cover the mold 10 from the bottom 102 to the top 101 and to supply heat to or to dissipate heat from the mold 10 in an annular range of the mold 10. Each zone borders the annular range axially.

Instead of integrating only a single heat supplying or heat dissipating zone, for instance zone 21, in a single contractible jacket section, for instance jacket section 201, one or more of the heating zones, for instance zones 21 and 22 and if desired also zone 23 and a further zone, can be integrated in a single contractible jacket section 200 of the tubular jacket 20. Such an exemplary embodiment of the jacket according to the disclosure is shown in FIG. 3. The integration of the two zones 21, 22 or of more zones in a single jacket section 200, simplifies the opening and closing of the jacket tube 20.

In order to simplify the opening and closing of the contractible jacket sections, for instance 201, 202, 203, 200, additionally the tubular jacket 20 includes three carriers vertically extended from the bottom 102 to the top 101 of the mold 10. One of these three carriers is stationary. Just one of the three jacket segments 211 of all jacket sections is supported on one of these three carriers. The jacket segments 211 which carry the two hinges 212 are supported on the stationary carrier (not shown), whereas the remaining jacket segments are supported on two movable carriers from which a carrier 24 arranged on the left is shown.

An enclosure 25 of a thermal insulating material surrounds uniformly the charged mold 10 and the closed jacket 20 together with fittings of the mold and the jacket. Thus heat dissipation due to convection to the ambient air or to radiation can be prevented. The enclosure 25 is thick enough to cover all the fittings of the mold 10 and the jacket 20. For this reason local cooling due to thermal bridges which could cause the temperature distribution in the mold 10 to deviate from the axially symmetric can be prevented.

In the casting station, a pipe is installed at the combined inlet and outlet $I_1$ of the mold 10. The combined inlet and outlet $I_1$ is arranged on the top 101 of the mold 10, for example in the module 11a. The pipe connects the mold cavity 14 with an expansion vessel E. The expansion vessel E includes two terminals P, V which optionally can apply gas under pressure or a vacuum to the expansion vessel E and the mold cavity 14.

In the casting station, the zones of the jacket 20 are connected to a conveying and heating unit 30 for conveying and for heating or cooling the heat carrier fluid. The connection can be realized by a conduit 35 which connects the outlet 236 of zone 23 to an inlet of the conveying and heating unit 30. A conduit 36 connects an outlet of the conveying and heating unit 30 to the inlet 235 of the zone 23. The conveying and heating unit 30 includes a conveying pump 31, a control valve arrangement 32 with two valves which are connected in parallel to the inlet of the unit 30 and with two further valves which are connected in parallel to the outlet of the unit 30, a heater 33 and a heat exchanger 34. The unit 30 is controllable in a manner to convey the heat carrier fluid through the heater 33 or through the heat exchanger 34.

Instead of a control valve arrangement 32 in the conveying and heating unit 30, the heater 33 and the heat exchanger 34 can be simply arranged in series along the conduits 35, 36 and be controlled with a unit 40 to operate or not (FIG. 3).

The control unit 40 controls the temperature and the amount of conveyed heat carrier fluid at the outlet of the conveying and heating unit 30. The control unit 40 receives signals from a temperature sensor 41 which is arranged in the zone 23 or in the conduit 36 between the outlet of the conveying and heating unit 30 and the inlet 235 of the zone 23. The control unit 40 further receives signals from a mass flow sensor arranged between the outlet 235 and the inlet 236, for instance in the conveying pump 31.

Each of all the zones, for instance the zones 22 and 21, are connected in the same manner to a further conveying and heating unit and include a temperature sensor 41. Thus the zones independently from each other can be heated or cooled with a heat carrier fluid.

In the casting station, the mold 10 is heated up to a casting temperature and evacuated over the expansion vessel E and the terminal V. Heated liquid casting resin, for example on the basis of an epoxy, enters the evacuated mold cavity from the bottom via the inlet $I_2$ arranged on the bottom 102 of the mold and if required also via the further inlets $I_2$ and slightly overfill the mold 10 by pouring via the combined inlet and outlet $I_1$ in the expansion vessel E. Then a further entering of casting resin into the mold 20 can be stopped.

Now a specified curing program which is adjusted to the size of the condenser core, is executed and cures the core in the next couple hours. In the beginning of the curing process the temperature in the bottom 102 is kept highest. Thus, in the lowest heat supplying or heat dissipating zone, for instance in the zone 23, temperature and flow rate of the heat carrier fluid are high. The heat carrier fluid then circulates via outlet 236, conveying pump 31, heater 33 and inlet 235 through the conduit arranged in the zone 23. Depending on the degree of curing in a next step, the temperature in the adjoining zone 22 will be adjusted to a higher curing temperature. In a corresponding conveying and heating unit 30, the temperature and the flow rate of the heat carrier fluid will be increased. If required the temperature in the zone 23 will be reduced by cooling the heat carrier fluid. The heat carrier fluid circulating through the zone 23 then instead of the heater 33 passes the heat exchanger 34 which can be cooled in a known manner with water.

For reason of the heat supplying or heat dissipating zones, which independently from each other can be heated or cooled, very specific curing programs can be executed. In connection with the cylindrical design of the mold 10, a distribution of the heat can be achieved with a severe axial symmetry around the axis A and with modifications along the axis A which allow a temperature-controlled curing along the axis from the bottom 102 to the top 101 of the mold 10 according to any specified curing program. Axial symmetry means that the temperature in any zone, for instance 23, and thus in any range of the mold 10 which is in thermal contact with the zone, is constant.

Via terminal P air pressurizes the liquid resin and presses the resin via the combined inlet and output $I_1$ into the mold cavity 14 in order to compensate the shrinkage of the resin resulting from the curing process.

After the curing process the insulating enclosure 25 will be removed and the jacket 20 will be opened by releasing the contradicted jacket sections, like 201, 202, 203 or 200. The mold 10 will be brought back to an assembling station in which the mold is opened at an sealing interface, for instance S1, and the condenser core will be taken out of the mold 10 and the mold will be configured for the next casting.

In an exemplary embodiment of the mold according to the disclosure shown in FIG. 4, the mold includes one or more heat supplying or heat dissipating zones 21, 22, 23 that are annular around the mold cavity 14, that are arranged one on top of the other from the bottom 102 to the top 101 of the mold 10 and that are adjustable independently from one another with respect to the supply or dissipation of heat. As indicated in FIG. 4 each of the three mold modules 11, 12, 13 includes one or more conduits for receiving the heat carrier fluid. Each of the conduits includes at least an inlet 235 and an outlet 236 (only the inlets and outlets of the conduits arranged in the modules 11 and 12 are marked) and can be supplied in the curing process with heated or cooled heat carrier fluid which results in the formation of the zones, like 21, 22, 23, as discussed before.

Thus, it will be appreciated by those skilled in the art, that the present disclosure can be embodied in other specific forms without departing from the spirit or essential characteristics thereof. The presently disclosed exemplary embodiments are therefore considered in all respects to be illustrative and not restricted. The scope of the disclosure is indicated by the appended claims rather than the foregoing description and all changes that come within the meaning and range and equivalence thereof are intended to be embraced therein.

LIST OF REFERENCE SIGNS

A axis of symmetry
C prefabricated condenser core
E expansion vessel
$I_1$ combined inlet and outlet
$I_2$ resin inlet
P pressure inlet
V vacuum inlet
S1, S2 sealing interfaces
10 mold
11, 12, 13 mold modules
11a, 11b modular sections
14 mold cavity
15 pedestal
101 top of the mold
102 bottom of the mold
103 holes
104 assembling aid
111, 121, 122, 131 front faces
123, 133 grooves
20 contractible tubular jacket
200, 201, 202, 203 contractible jacket sections
21, 22, 23 heat supplying and heat dissipating zones
211 jacket segments
212 hinges
213 part of a clamping device
214 counterpart of the clamping device
24 carrier
25 thermal insulating enclosure
26 hose
235 inlet of zones 21, 22, 23
236 outlet of zone 21, 22, 23
30 conveying and heating unit 31 conveying pump
32 control valve arrangement
33 heater
34 heat exchanger
35, 36 conduits
40 control unit
41 temperature sensor

What is claimed is:

1. A mold for impregnating a prefabricated condenser core (C) of a high voltage bushing with a liquid resin, the mold comprising:
   at least two mold modules movable against each other and shaped to form a mold cavity, the mold being a column of cylindrical design, in which the at least two mold modules are arranged one on top of the other; and
   a first mold module of the at least two mold modules is a hollow cylinder, and the at least two mold modules each have a front face for forming a first sealable interface with an opposing front face of another mold module of the at least two mold modules;
   wherein the first mold module comprises an inner surface, at least a part of the inner surface of the first mold module tapering conically from the first sealable interface to a bottom of the mold.

2. The mold according to claim 1, wherein a second mold module of the at least two mold modules is a hollow cylinder comprises:
   a closed front face forming a top of the mold; and
   an inner surface, at least part of the inner surface tapering conically from the first sealable interface to a top of the mold.

3. The mold according to claim 1, wherein a second mold module comprises:
   a modular section which is a disk.

4. The mold according to claim 3, wherein the disk comprises:
   at least a combined inlet and outlet ($I_1$) for applying liquid resin from the mold cavity to an expansion vessel or for applying optionally a liquid resin under pressure or a vacuum to the mold cavity.

5. The mold according to claim 1, comprising:
   at least a third mold module arranged with a front face opposing the front face of the first mold module wherein the two opposing front faces of the first and the third mold module form a second sealable interface of the mold.

6. The mold according to claim 5, wherein the at least third mold module is a hollow cylinder, and the third mold module comprises:
   includes an inner surface, at least part of the inner surface tapering conically from the second sealable interface to the bottom of the mold.

7. The mold according to claim 5, wherein the third mold module forms a bottom of the mold and comprises:
   at least a first inlet ($I_2$) for applying liquid resin to the evacuated mold cavity.

8. The mold according to claim 7, comprising:
   at least a second inlet ($I_2$) arranged in a cylindrical wall of at least one of the third and the first mold modules for applying liquid resin to an evacuated mold cavity.

9. The mold according to claim 1, comprising:
   axially extended holes for receiving bolt members inserted into the opposing two front faces of the at least two mold modules.

10. The mold according to claim 1, comprising:
    an assembling aid inserted into the opposing two front faces of the at least two mold modules.

11. The mold according to claim 1, comprising:
    at least one groove for receiving an O-ring inserted into one of the two opposing front faces of the at least two mold modules.

12. The mold according to claim 1, comprising:
    at least two heat supplying or heat dissipating zones that are annular around the mold cavity, arranged one on top of the other from a bottom to a top of the mold and adjustable independently from one another with respect to supply or dissipation of heat.

13. A device for forming a condenser core of a high voltage bushing, the device comprising:
    a mold for impregnating a prefabricated condenser core (c) of a high voltage bushing with a liquid resin, the mold including:
      at least two mold modules movable against each other and shaped to form a mold cavity, the mold being a column of cylindrical design, in which the at least two mold modules are arranged one on top of the other;
      a first mold module of the at least two mold modules being a hollow cylinder; and
      the at least two mold modules each having a front face for forming a first sealing interface, with an opposing front face of another mold module of the at least two mold modules; and
    a heater for controlling temperature of the mold when in a curing process, the heater, comprising:
      a contractible tubular jacket vertically extending from a bottom to top of the mold, the tubular jacket including at least two heat supplying or heat dissipating zones annular around the mold, that are arranged one on top of the other from the bottom to the top of the mold, and that are adjustable independently from one another with respect to the supply or dissipation of heat.

14. The device according to claim 13, wherein a first of the at least two zones is integrated in a first of at least two annular contractible sections of the tubular jacket and a second of the at least two zones is integrated in a second of the at least two jacket sections, and wherein each of the at least two contractible jacket sections comprises:
    at least two curved jacket segments which are pivotably linked together; and
    tensioners for pushing the at least two curved jacket segments against a cylindrical surface of the mold.

15. The device according to claim 14, wherein
    only one curved jacket segment of each of the at least two jacket sections is supported on a stationary carrier of the at least two contractible jacket sections.

16. The device according to claim 13, wherein a first and a second of the at least two zones are integrated in an annular contractible section of the tubular jacket and the contractible jacket section comprises:
    at least two curved jacket segments pivotably linked together; and
    tensioners for pushing the at least two curved jacket segments against a cylindrical surface of the mold.

17. The device according to claim 13, wherein each of the at least two heat supplying or heat dissipating zones comprises:
    a first conduit with an inlet and an outlet for receiving a heat carrier fluid.

18. The device according to claim 13, wherein the heater comprises:
    a conveying and heating unit for conveying, and heating or cooling a heat carrier fluid;

a second conduit which connects an outlet of the first conduit to an input of the conveying and heating unit;

a third conduit which connects an output of the conveying and heating unit to an inlet of the first conduit; and a control unit arranged to control temperature and an amount of conveyed heat carrier fluid at the output of the conveying and heating unit.

19. The device according claim 18, wherein the conveying and heating unit comprises:

a conveying pump;

a control valve arrangement; and a heater and a heat exchanger, wherein the control unit is arranged to control the conveying and heating unit in a manner to convey heat carrier fluid through the heater or the heat exchanger.

20. The device according to claim 17, comprising:

at least two temperature sensors, wherein a first temperature sensor is arranged in the first of the at least two heat supplying or heat dissipating zones.

21. The device according to claim 18, comprising:

at least two temperature sensors, wherein a first temperature sensor is arranged in the third conduit.

22. The device according to claim 13, comprising:

an enclosure of a thermal insulating material enclosing the tubular jacket and fittings of the mold and the tubular jacket tube.

23. A mold for impregnating a prefabricated condenser core (C) of a high voltage bushing with a liquid resin, the mold comprising:

at least two mold modules movable against each other and shaped to form a mold cavity, the mold being a column of cylindrical design, in which the at least two mold modules are arranged one on top of the other; and a first mold module of the at least two mold modules is a hollow cylinder, and the at least two mold modules each have a front face for forming a first sealable interface with an opposing front face of another mold module of the at least two mold modules;

wherein a second mold module of the at least two mold modules is a hollow cylinder comprises:

a closed front face forming a top of the mold; and an inner surface, at least part of the inner surface tapering conically from the first sealable interface to a top of the mold.

24. The mold according to claim 23, wherein a second mold module comprises:

a modular section which is a disk.

25. The mold according to claim 24, wherein the disk comprises:

at least a combined inlet and outlet ($I_1$) for applying liquid resin from the mold cavity to an expansion vessel or for applying optionally a liquid resin under pressure or a vacuum to the mold cavity.

26. A mold for impregnating a prefabricated condenser core (C) of a high voltage bushing with a liquid resin, the mold comprising:

at least two mold modules movable against each other and shaped to form a mold cavity, the mold being a column of cylindrical design, in which the at least two mold modules are arranged one on top of the other;

a first mold module of the at least two mold modules is a hollow cylinder, and the at least two mold modules each have a front face for forming a first sealable interface with an opposing front face of another mold module of the at least two mold modules; and at least two heat supplying or heat dissipating zones that are annular around the mold cavity, arranged one on top of the other from a bottom to a top of the mold and adjustable independently from one another with respect to supply or dissipation of heat.

\* \* \* \* \*